United States Patent
An et al.

(10) Patent No.: US 8,949,787 B2
(45) Date of Patent: Feb. 3, 2015

(54) LOCATING ISOLATION POINTS IN AN APPLICATION UNDER MULTI-TENANT ENVIRONMENT

(75) Inventors: Wen Hao An, Beijing (CN); Hong Cai, Beijing (CN); Liya Fan, Beijing (CN); Bo Gao, Beijing (CN); Chang Jie Guo, Beijing (CN); Li Li Ma, Beijing (CN); Zhi Hu Wang, Beijing (CN); Min Jun Zhou, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 211 days.

(21) Appl. No.: 13/600,619

(22) Filed: Aug. 31, 2012

(65) Prior Publication Data

US 2013/0055203 A1 Feb. 28, 2013

(30) Foreign Application Priority Data

Aug. 31, 2011 (CN) .......................... 2011 1 0270231

(51) Int. Cl.
*G06F 9/44* (2006.01)
*G06F 9/45* (2006.01)
*H04L 29/08* (2006.01)

(52) U.S. Cl.
CPC . *G06F 8/70* (2013.01); *H04L 67/10* (2013.01)
USPC ............................. 717/120; 717/131; 717/156

(58) Field of Classification Search
CPC ......... G06F 8/71; G06F 8/20; G06F 11/3466; G06F 11/3688; G06F 8/443
See application file for complete search history.

(56) References Cited

U.S. PATENT DOCUMENTS

| | | | | |
|---|---|---|---|---|
| 6,957,422 | B2 * | 10/2005 | Hunt | 717/131 |
| 7,210,124 | B2 * | 4/2007 | Chan | 717/120 |
| 8,429,097 | B1 * | 4/2013 | Sivasubramanian et al. | 706/12 |
| 8,707,264 | B2 * | 4/2014 | Hossain et al. | 717/131 |
| 2004/0015816 | A1 * | 1/2004 | Hines et al. | 717/156 |
| 2004/0255273 | A1 * | 12/2004 | Chan | 717/120 |
| 2006/0174223 | A1 * | 8/2006 | Muir et al. | 717/106 |
| 2007/0028245 | A1 * | 2/2007 | Kaplan et al. | 719/313 |
| 2007/0134069 | A1 * | 6/2007 | Smith et al. | 406/39 |
| 2009/0037686 | A1 * | 2/2009 | Mendonca | 711/173 |
| 2009/0217248 | A1 * | 8/2009 | Bently et al. | 717/156 |
| 2009/0299920 | A1 * | 12/2009 | Ferris et al. | 717/120 |
| 2010/0005443 | A1 | 1/2010 | Kwok et al. | |
| 2010/0023937 | A1 | 1/2010 | Kothari et al. | |
| 2010/0049637 | A1 | 2/2010 | Laventman et al. | |
| 2010/0070449 | A1 * | 3/2010 | Arnold et al. | 706/48 |

(Continued)

OTHER PUBLICATIONS

Shue et al., "Performance Isolation and Fairness for Multi-Tenant Cloud Storage", Oct. 8-10, 2012, OSDI'12, pp. 1-14; <http://sns.cs.princeton.edu/docs/pisces-osdi12.pdf>.*

(Continued)

*Primary Examiner* — Thuy Dao
*Assistant Examiner* — Ben C Wang
(74) *Attorney, Agent, or Firm* — Cantor Colburn LLP (57) ABSTRACT

A computer implemented method for locating isolation points in an application under multi-tenant environment includes scanning, using a computer device an application by using scanning rules, to obtain potential isolation points and relationships between the potential isolation points; specifying at least one isolation point among the potential isolation points; and screening an isolation point from the potential isolation points by using relationships between the specified at least one isolation point and the remaining potential isolation points.

16 Claims, 4 Drawing Sheets

(56) References Cited

U.S. PATENT DOCUMENTS

| | | | |
|---|---|---|---|
| 2010/0077449 | A1 | 3/2010 | Kwok et al. |
| 2010/0121923 | A1 | 5/2010 | Cvetkovic et al. |
| 2010/0125612 | A1 | 5/2010 | Amradkar et al. |
| 2010/0198730 | A1 | 8/2010 | Ahmed et al. |
| 2010/0262977 | A1* | 10/2010 | Havemose ............... 719/310 |
| 2011/0088034 | A1* | 4/2011 | Vernier ............... 718/100 |
| 2011/0126168 | A1 | 5/2011 | Ilyayev |
| 2011/0265069 | A1* | 10/2011 | Fee et al. ............... 717/151 |
| 2012/0131173 | A1* | 5/2012 | Ferris et al. ............... 709/224 |
| 2012/0159455 | A1* | 6/2012 | Schmelter et al. ............... 717/130 |
| 2012/0266159 | A1* | 10/2012 | Risbood et al. ............... 717/177 |
| 2013/0239089 | A1* | 9/2013 | Eksten et al. ............... 717/120 |
| 2014/0043972 | A1* | 2/2014 | Li et al. ............... 370/230 |
| 2014/0068560 | A1* | 3/2014 | Eksten et al. ............... 717/120 |
| 2014/0075412 | A1* | 3/2014 | Kannan et al. ............... 717/120 |
| 2014/0245261 | A1* | 8/2014 | Eksten et al. ............... 717/120 |
| 2014/0282395 | A1* | 9/2014 | Wang et al. ............... 717/120 |
| 2014/0282433 | A1* | 9/2014 | Eilam et al. ............... 717/131 |
| 2014/0282434 | A1* | 9/2014 | Eilam et al. ............... 717/131 |

OTHER PUBLICATIONS

Krebs et al., "Metrics and Techniques for Quantifying Performance Isolation in Cloud Environments", 2012 ACM, QoSA'12, Jun. 25-28, 2012, Bertinoro, Italy, pp. 91-100; <http://dl.acm.org/results.cfm?h=1&cfid=426126065&cftoken=89011491>.*

Krebs et al., "Resource Usage Control in Multi-Tenant Applications", May 26-29, 2014 IEEE, pp. 122-131; <http://ieeexplore.ieee.org/stamp/stamp.jsp?tp=&arnumber=6846447>.*

Wil M.P. Van Der Aalst, "Configurable Services in the Cloud: Supporting Variability While Enabling Cross-Organizational Process Mining," On the Move to Meaningful Internet Systems OTM 2010, pp. 1-18, 2010.

Afkham Azeez, et al., "Multi-Tenant SOA Middleware for Cloud Computing," 3rd International Conference on Cloud Computing, Florida, pp. 1-8; 2010.

Christof Momm, et al., "A Qualitative Discussion of Different Approaches for Implementing Multi-Tenant SaaS Offerings," In Proceedings of Software Engineering 2011 (SE2011), Workshop(ESoSyM-2011), pp. 1-12.

Bikram Sengupta, et al.,"Engineering Multi-Tenant Software-as-a-Service Systems," ICSE'11, ACM, p. 1-7, May 2011.

* cited by examiner

LOCATING ISOLATION POINTS IN AN APPLICATION UNDER MULTI-TENANT ENVIRONMENT

PRIORITY

This application claims priority to Chinese Patent Application No. 201110270231.0, filed 31 Aug. 2011, and all the benefits accruing therefrom under 35 U.S.C. §119, the contents of which in its entirety are herein incorporated by reference.

BACKGROUND

The present invention relates generally to Software as a Service (SaaS), and more specifically, to a method and system for locating isolation points in an application under multi-tenant environment.

With the development of Internet technology, SaaS provides software to clients in a form of services and helps software developers to attract clients by providing services. Thanks to the emergence of cloud computing, the security and reliability of SaaS are recognized and trusted by more and more enterprises. As a core technology of SaaS applications, multi-tenancy receives more and more concerns. An idea of multi-tenancy is to deposit data and business processes of multiple tenants on the same server group of a SaaS service provider and use them simultaneously through isolation, confidentiality and other techniques of software and database, with a purpose to allow multiple enterprises (or multiple tenants within an enterprise) to share software and hardware resources, increase utilization rate of resources and reduce the average infrastructure and management cost shared by individual tenants.

Although multi-tenancy can increase utilization rate of resources, it is prone to some problems, among which how to ensure data isolation between respective tenants is one of tough issues confronting multi-tenant applications. One application instance needs to support resource sharing among multiple tenants and ensure that data of multiple tenants can be isolated securely, so as to correctly run application instances of multiple tenants. During program development and conversion (modified to a multi-tenant mode) of an application, developers of this application need to determine isolation points of application instances, wherein isolation points are resources owned by multiple tenants respectively, such as some files, static variables, databases and buffers, and they differ from shared points that are resources shared among multiple tenants. Conventional methods require developers to determine isolation points by manually looking up in all databases and source code, which involves a huge amount of isolation. In addition to a considerable cost of manpower, conventional methods are low-efficiency and bad-accuracy.

Therefore, there is a need for a method of efficiently and accurately locating isolation points in an application under multi-tenant environment.

SUMMARY

In one embodiment, a computer implemented method for locating isolation points in an application under multi-tenant environment includes scanning, using a computer device an application by using scanning rules, to obtain potential isolation points and relationships between the potential isolation points; specifying at least one isolation point among the potential isolation points; and screening an isolation point from the potential isolation points by using relationships between the specified at least one isolation point and the remaining potential isolation points.

BRIEF DESCRIPTION OF THE SEVERAL VIEWS OF THE DRAWINGS

Embodiments of the present invention itself, preferred embodiments, objects and advantages thereof will be better understood from the following embodiments which describe in detail a method and system for locating isolation points in an application under multi-tenant environment, with reference to the accompanying drawings, wherein.

DETAILED DESCRIPTION

Hereinafter, objects and advantages of the present invention will be better understood with reference to the figures by describing a method and system for locating isolation points in an application under multi-tenant environment according to embodiments of the present invention.

Figure 1:
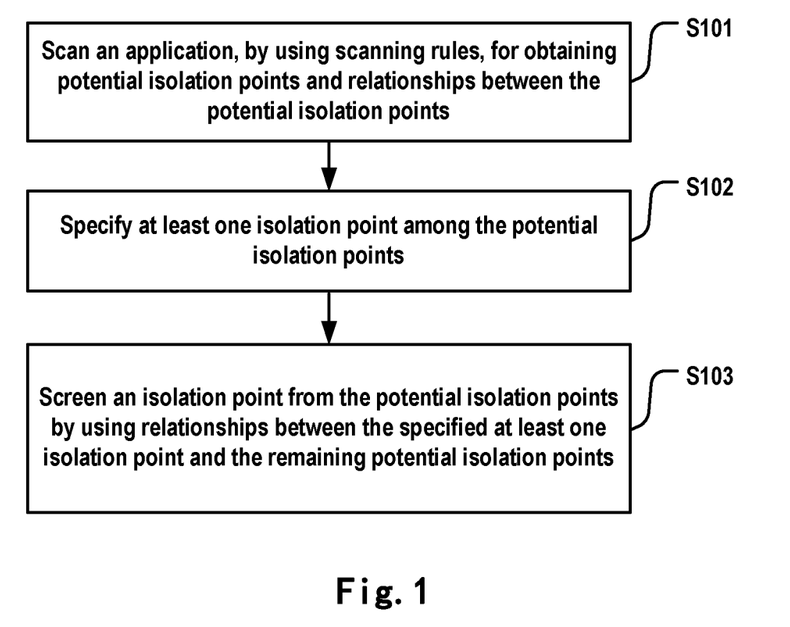
FIG. 1 illustrates a method of locating isolation points in an application under multi-tenant environment according to one embodiment of the present invention.

FIG. 1 illustrates a method of locating isolation points in an application under multi-tenant environment according to one embodiment of the present invention. The method comprises: block S101 of scanning an application, by using scanning rules, for obtaining potential isolation points and relationships between the potential isolation points; block S102 of specifying at least one isolation points among the potential isolation points; block S103 of screening a real isolation point by using relationships between the specified at least one isolation point and the remaining potential isolation points.

In block S101, the application is scanned by using scanning rules, in order to obtain potential isolation points and relationships between the potential isolation points.

First of all, scanning rules are pre-defined. The scanning rules are used for looking up potential isolation points and relationships between the potential isolation points. According to the embodiments of the present invention, potential isolation points comprise an isolation point of a static variable type, an isolation point of a file type, and an isolation point of a database type. For an isolation point of the static variable type, all variable statements are found through static analysis of the application, and a keyword "static" is searched among all variable statements, whereby a static variable is found and attributes of the isolation point of the static variable type are obtained, i.e., a name and category of the static variable, a class to which the static variable belongs, and a starting position of the static variable. By attributes of the isolation point of the static variable type, it is possible to uniquely determine the isolation point of the static variable type. For an isolation point of the file type, invocation of file API is found through static analysis of the application, and values returned from the API and parameters for invoking the API are analyzed to obtain attributes of the isolation point of the file type, i.e., a name and directory of the file. By attributes of the isolation point of the file type, it is possible to uniquely determine the isolation point of the file type. For an isolation point of a database type, statements for creating a table structure are found through static analysis of database scripts, and the statements for creating the table structure are analyzed to obtain attributes of an isolation point of a database type, i.e., a table structure and a table name. By attributes of the isolation point of the database type, it is possible to uniquely determine the isolation point of the database type.

Relationships between the potential isolation points as defined in scanning rules at least comprise one of an assignment relationship and a membership relationship, wherein the assignment relationship indicates that one potential isolation point is assigned to another one; and the assignment relationship comprises direct assignment, parameter passing, and function invocation returned value assignment; and the membership relationship indicates that one potential isolation point contains another one.

According to the embodiment of the present invention, potential isolation points of a static variable type, a file type and a database type have six types of relationships between them, i.e., a relationship between isolation points of a static variable type, a relationship between an isolation point of a static variable type and an isolation point of a file type, a relationship between an isolation point of a static variable type and an isolation point of a database type, a relationship between isolation points of a file type, a relationship between an isolation point of a file type and an isolation point of a database type, and a relationship between isolation points of a database type. These six types of relationships between isolation points will be introduced below respectively.

A relationship between potential isolation points of a static variable type comprises an assignment relationship and a membership relationship, wherein the assignment relationship indicates that a value of one static variable is assigned to another one, and comprises direct assignment, parameter passing, and function invocation returned value assignment; the membership relationship indicates that one static variable is a member of another one.

A relationship between a potential isolation point of a static variable type and a potential isolation point of a file type comprises an assignment relationship, wherein the assignment relationship comprises: assigning content of a file to a variable; and assigning a variable to a file.

A relationship between a potential isolation point of a static variable type and a potential isolation point of a database type comprises an assignment relationship, wherein the assignment relationship comprises: assigning content of a database to a variable; and assigning a variable to a database.

A relationship between potential isolation points of a file type comprises an assignment relationship and a membership relationship, wherein the assignment relationship indicates that content of a file is assigned to a variable and the variable is assigned to another file, and the membership relationship indicates that one file is a sub-file of another file of a directory type.

A relationship between a potential isolation point of a file type and a potential isolation point of a database type comprises an assignment relationship, wherein the assignment relationship indicates that content of a file is assigned to a variable and the variable is assigned to a database, or content of a database is assigned to a variable and the variable is assigned to a file.

A relationship between potential isolation points of a database type comprises an assignment relationship, wherein the assignment relationship indicates that content of a database is assigned to a variable and the variable is assigned to the database; a relationship between potential isolation points of a database type further comprises reading and writing a database to another one by SQL (structured query language).

Figure 2:
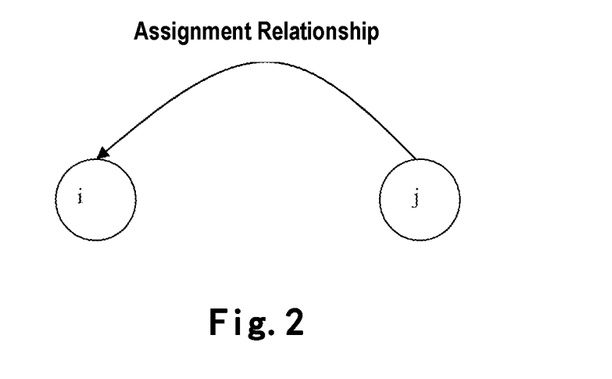
FIG. 2 illustrates an example of a directed graph constructed according to one embodiment of the present invention.

Codes of an application are scanned by using scanning rules, in order to obtain potential isolation points of the above types and in the above relationships. According to the embodiment of the present invention, a directed graph $G=(V, E)$ is constructed using obtained potential isolation points and relationships between the potential isolation points. The directed graph is formed by a plurality of nodes V and at least one directed edge, wherein V denotes a set of nodes, E denotes a set of directed edges between nodes, each node denotes a potential isolation point, and a directed edge pointing from one node to another denotes the relationship between potential isolation points. For example, static variables i and j of potential isolation points are obtained by scanning program code; int i=j, so it can be determined that a relationship between static variables i and j is an assignment relationship. FIG. 2 illustrates an example of a directed graph constructed according to one embodiment of the present invention. As illustrated in this figure, nodes i and j denote static variable i and j, respectively, and a directed edge pointing from node j to node i indicates that a value of static variable j is assigned to static variable i.

In block S102, at least one isolation point is specified among the potential isolation points. Developers of an application specify at least one isolation point among potential isolation points according to an application scenario of the application.

In block S103, an isolation point is screened from the potential isolation points using relationships between the specified at least one isolation point and the remaining potential isolation points. Specifically, an isolation point is determined by applying isolation point determining rules to potential isolation points in the constructed directed graph.

According to the embodiment of the present invention, if the specified at least one isolation point is assigned to a potential isolation point, then it is determined that the potential isolation point is an isolation point. For example, regarding specified isolation point a and potential isolation point b that are in an assignment relationship, if a is assigned to b and a is an isolation point, then it can be determined that b is also an isolation point. Isolation point determining rules of the embodiment of the present invention are not limited to isolation points in a direct assignment relationship, but also apply to a plurality of isolation points in a transitive assignment relationship. For example, for specified isolation point a and potential isolation points b and c, if a is assigned to b and b is assigned to c, then it can be determined that b and c are both isolation points.

According to the embodiment of the present invention, if the specified at least one isolation point contains a potential isolation point, then it is determined that the potential isolation point is an isolation point. As an example, for specified isolation point a and potential isolation point b that are in a membership relationship, if a contains b, then it can be determined that b is an isolation point too.

Figure 3:
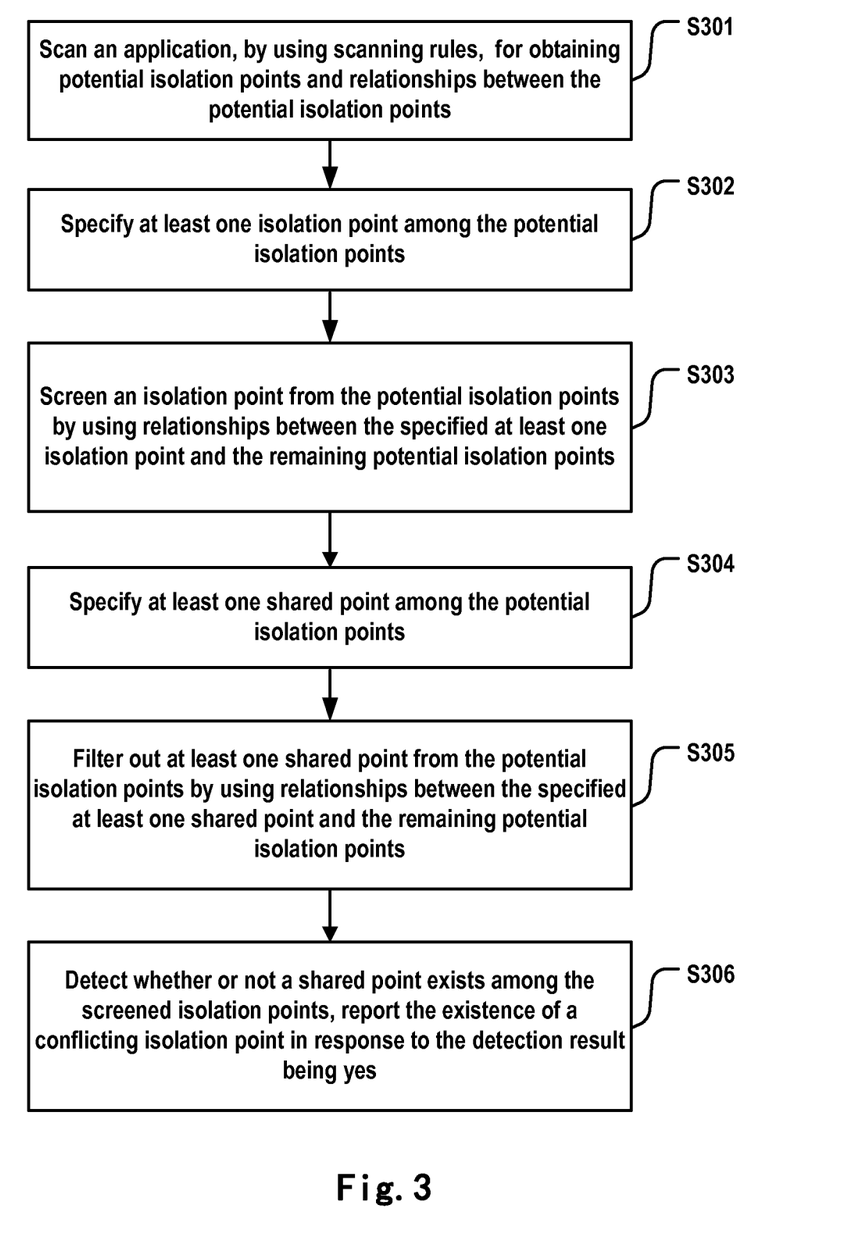
FIG. 3 illustrates a method of locating isolation points in an application under multi-tenant environment according to one embodiment of the present invention.

FIG. 3 illustrates a method of locating isolation points in an application under multi-tenant environment according to one embodiment of the present invention. Blocks S301 through S303 correspond to blocks S101 through S103, respectively, so they are not detailed here and for their implementation, please refer to blocks S101 through S103. According to the embodiment of the present invention, blocks S304 through S306 are added.

In block S304, at least one shared point is specified among the potential isolation points. Developers of an application specify at least one shared point among potential isolation points according to an application scenario of the application. In block S305, at least one shared point is filtered out by using relationships between the specified at least one shared point and the remaining potential isolation points.

According to the embodiment of the present invention, if a potential isolation point is assigned to the shared point, then it is determined that the potential isolation point is also a shared point. For example, regarding potential isolation point b and shared point a that are in an assignment relationship, if b is assigned to a, then it can be determined that b is also a shared point. Shared point determining rules according to the embodiment of the present invention are not limited to shared points in a direct assignment relationship, but also apply to a plurality of shared points in a transitive assignment relationship. As an example, for specified shared point a and potential isolation points b and c, if c is assigned to b and b is assigned to a, then it can be determined that b and c are both shared points.

According to the embodiment of the present invention, if a potential isolation point contains the shared point, then it is determined that the potential isolation point is a shared point. For example, for shared point a and potential isolation point b that are in a membership relationship, if b contains a, then b is also a shared point.

In block S306, it is detected whether or not a shared point exists among screened isolation points, and the existence of a conflicting isolation point is reported in response to the detection result being yes. After isolation points are screened using the isolation point determining rules and a shared point is filtered out by using the shared point determining rules, it is detected whether or not the shared point exists among screened isolation points. If the shared point exists, then a conflicting isolation point is reported and left for developers of the application to handle.

Figure 4:
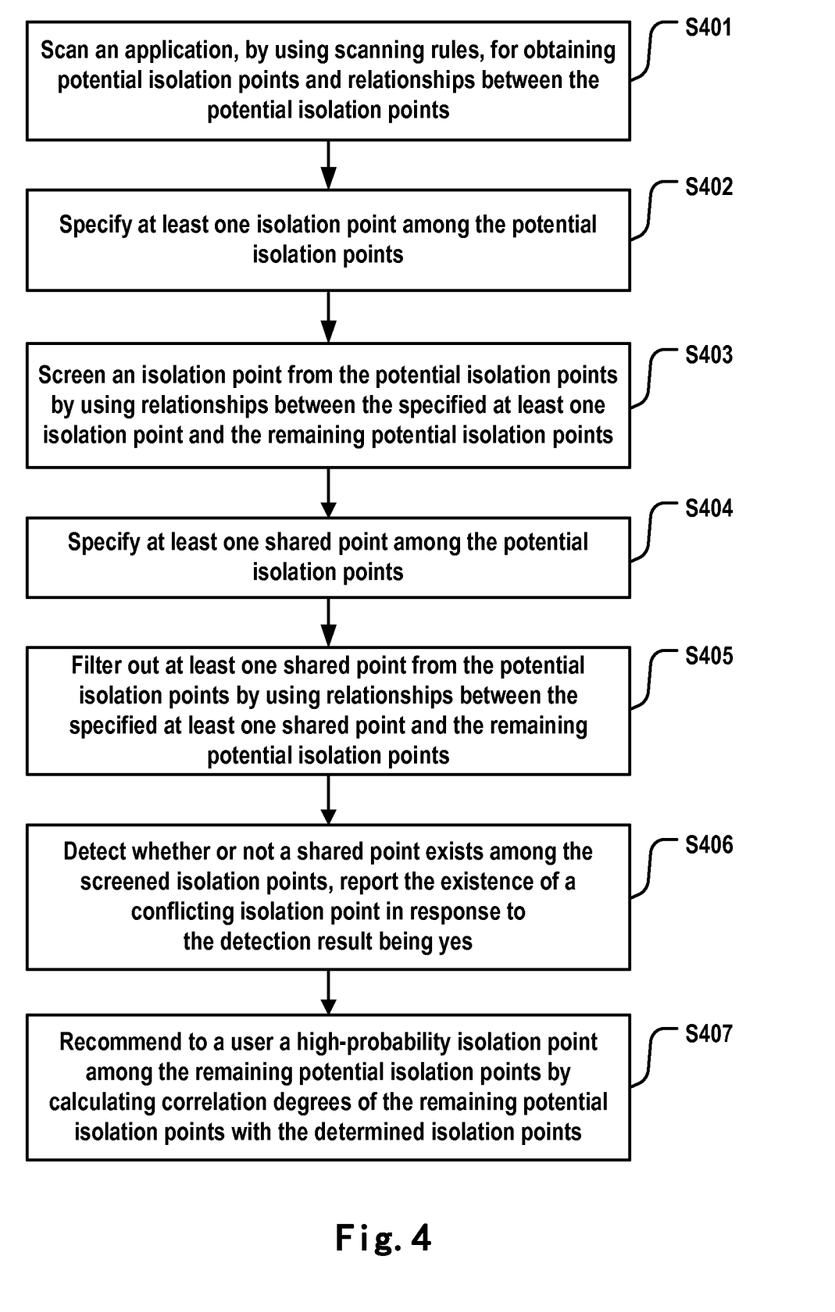
FIG. 4 illustrates a method of locating isolation points in an application under multi-tenant environment according to one embodiment of the present invention.

FIG. 4 illustrates a method of locating isolation points in an application under multi-tenant environment according to one embodiment of the present invention. Blocks S401 through S406 correspond to blocks S301 through S306, respectively, so they are not detailed here and for their detailed implementation, please refer to blocks S301 through S306. According to the embodiment of the present invention, block S407 is added.

In block S407, a high-probability isolation point among the remaining potential isolation points are recommended to a user by calculating correlation degrees of the remaining potential isolation points with the determined isolation points.

According to the embodiment of the present invention, correlation degrees of the remaining potential isolation points with the determined isolation points are calculated using a recommendation algorithm. Suppose given directed graph G=(V, E), wherein V denotes a set of nodes, and E denotes a set of directed edges between nodes. According to the above method, set V of nodes is divided into a set of isolation points $V_d(u_1, u_2 \ldots u_n)$, a set of potential isolation points $V_p(v_1, v_2 \ldots v_m)$, and a set of shared points $V_S(w_1, w_2 \ldots w_k)$. Any potential isolation point $v_j$ is selected from the set $V_p$ of potential isolation points, and distance d $(v_j, u_i)$ between each isolation point $u_i$ in the set of isolation points $V_d(u_1, u_2 \ldots u_n)$ and a potential isolation point $v_j$ is calculated. Floyd-Warshall algorithm is an algorithm for solving the shortest path between any two points. Hence, Floyd-Warshall algorithm may be used to calculate the distance d $(u_i, v_j)$ between each isolation point $u_i$ in the set of isolation points $V_d(u_1, u_2 \ldots u_n)$ and potential isolation point $v_j$.

Let $V=\{x_1, x_2, \ldots, x_p\}$ be all nodes in set V of nodes; let $d^k(u_i, v_j)$ be the length of the shortest path from $u_i$ to $v_j$ that takes a node of set $\{x_1, x_2, \ldots, x_k\}$ as the intermediate node only.

If the shortest path passes through node $x_k$, then $d^k(u_i,v_j)=d^{k-1}(u_i,x_k)+d^{k-1}(u_i,v_j)$.

If the shortest path does not pass through node $x_k$, then $d^k(u_i,v_j)=d^{k-1}(x_k,v_j)$. Therefore, $d^k(u_i,v_j)=\min(d^{k-1}(u_i,x_k)+d^{k-1}(x_k,v_j), d^{k-1}(u_i,v_j))$.

The smallest value of the shortest distance d $(u_i,v_j)(u_i \epsilon V_d)$ between each isolation point $u_i$ in the set of isolation points $V_d(u_1, u_2 \ldots u_n)$ and potential isolation point $v_j$ as calculated by the above algorithm is selected as the distance between the set of isolation points $V_d(u_1, u_2 \ldots u_n)$ and potential isolation point $v_j$:

$$D(v_j)=\min\{d^k(u_i,v_j)|u_i \epsilon V_d\}$$

The distances $D(v_j)(v_j \epsilon V_p)$ between set $V_d$ of isolation points and all potential isolation points are calculated according to the above method, and they are presented to a user in order of magnitude of $D(v_j)$. The greater $D(v_j)$, the less probability that the potential isolation point is an isolation point. In this way, a list of recommended isolation points is provided to developers of an application, so that developers first look up a high-probability isolation point according to the list of recommended isolation points, thereby saving human and time costs of manual lookup.

Figure 5:
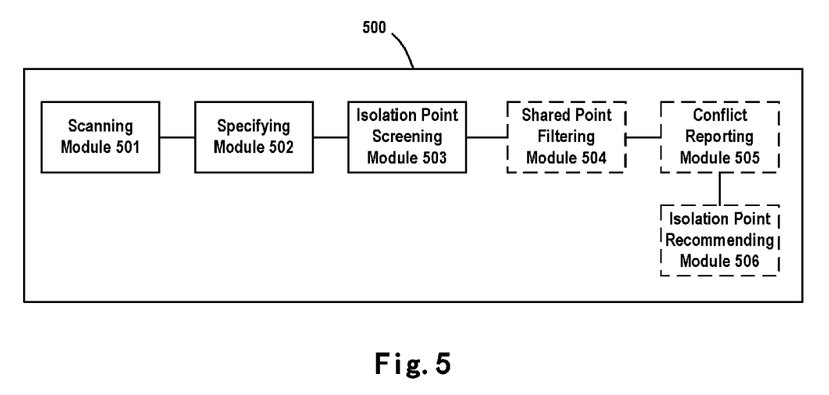
FIG. 5 illustrates a block diagram of an apparatus for locating isolation points in an application under multi-tenant environment according to one embodiment of the present invention.

Based on the same inventive concept, the present invention proposes an apparatus for locating isolation points in an application under multi-tenant environment. FIG. 5 illustrates an apparatus for locating isolation points in an application under multi-tenant environment according to one embodiment of the present invention. The apparatus comprises: a scanning module 501 configured to scan an application, by using scanning rules, for obtaining potential isolation points and relationships between the potential isolation points; a specifying module 502 configured to specify at least one isolation point among the potential isolation points; and an isolation point screening module 503 configured to screen isolation points from the potential isolation points by using relationships between the specified at least one isolation point and the remaining potential isolation points.

According to the embodiment of the present invention, the relationships between the potential isolation points at least comprise one of an assignment relationship and a membership relationship.

According to the embodiment of the present invention, the isolation point screening module 503 is further configured to determine a potential isolation point as the isolation point if the specified at least one isolation point is assigned to the potential isolation point.

According to the embodiment of the present invention, the isolation point screening module 503 is further configured to determine a potential isolation point as the isolation point if the specified at least one isolation point contains the potential isolation point.

According to the embodiment of the present invention, the specifying module 502 is further configured to specify at least one shared point among the potential isolation points. According to the embodiment of the present invention, the apparatus further comprises a shared point filtering module 504 configured to filter out a shared point among the potential isolation points by using relationships between the specified at least one shared point and the remaining potential isolation points.

According to the embodiment of the present invention, the shared point filtering module 504 is further configured to determine a potential isolation point as the shared point if the potential isolation point is assigned to the specified at least one shared point. According to the embodiment of the present invention, the shared point filtering module is further configured to determine a potential isolation point as the shared point if the potential isolation point contains the specified at least one shared point.

According to the embodiment of the present invention, further comprised is a conflict reporting module 505 configured to report the existence of a conflicting isolation point if it is detected that a shared point exists among the screened isolation points.

According to the embodiment of the present invention, further comprised is an isolation point recommending module 506 configured to recommend to a user a high-probability isolation point among the remaining potential isolation points by calculating correlation degrees of the remaining potential isolation points with the screened isolation points.

Figure 6:
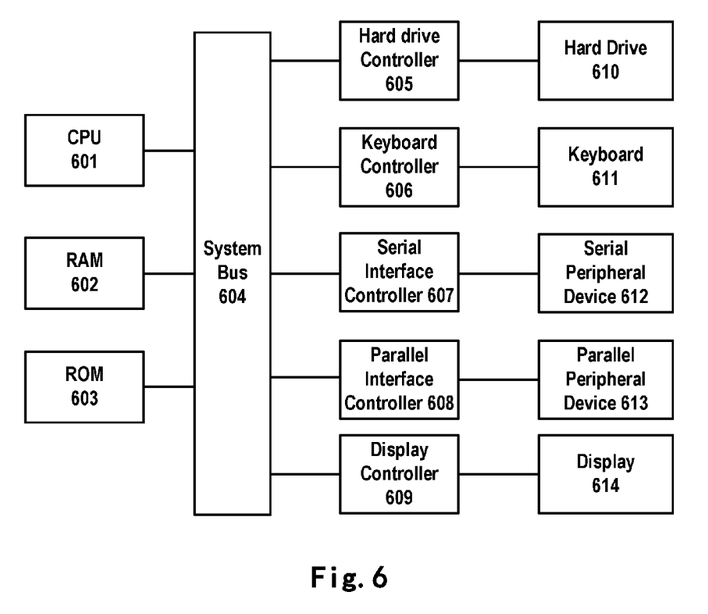
FIG. 6 illustrates a structural block diagram of a computer device in which embodiments of the present invention are implemented.

FIG. 6 illustrates a structural block diagram of a computer device in embodiments of the present invention may be implemented. The computer system as illustrated in FIG. 6 comprises: a CPU (central process unit) 601, RAM (random access memory) 602, ROM (read only memory) 603, a system bus 604, a hard drive controller 605, a keyboard controller 606, a serial interface controller 607, a parallel interface controller 608, a display controller 609, hard drive 610, a keyboard 611, serial peripheral device 612, parallel peripheral device 613 and a display 614. Among above components, the CPU 601, RAM 602, ROM 603, hard drive controller 605, keyboard controller 606, serial interface controller 607, parallel interface controller 608 and display controller 609 are coupled to the system bus 604. The hard drive 610 is coupled to the hard drive controller 605. The keyboard 611 is coupled to the keyboard controller 606. The serial peripheral device 612 is coupled to the serial interface controller 607. The parallel peripheral device 613 is coupled to the parallel interface controller 608. And, the display 614 is coupled to the display controller 609.

The function of each component in FIG. 6 is publicly known in this technical field, and the structure as illustrated in FIG. 6 is conventional. Such a structure is used for not only a personal computer but also a handheld device, such as Palm PC, PDA (personal digital assistant), a mobile telephone, etc. In different applications, for example, when implementing a user terminal including a client module according to the present invention or implementing a server host including a web application server according to the present invention, some components can be added to the structure illustrated in FIG. 6, or some components illustrated in FIG. 6 can be omitted. The whole system illustrated in FIG. 6 is controlled by computer readable instructions usually stored in the hard drive 610 as software, or stored in EPROM or other nonvolatile memories. The software can be downloaded from the network (not shown in the figure). The software stored in the hard drive 610 or downloaded from the network can be uploaded to the RAM 602 and executed by the CPU 601 to perform functions determined by the software.

Although the computer system as described in FIG. 6 can support the technical solution provided according to the present invention, it is merely one example of a computer system. Those skilled in the art would readily appreciate that many other computer system designs can also realize embodiments of the present invention.

With the method and apparatus for locating isolation points in an application according to embodiments of the present invention, it is possible to efficiently and accurately locate isolation points in an application and thereby save an enormous cost of manpower.

As illustrative embodiments of the present invention have been described with reference to the figures, the present invention is not limited to these accurate embodiments. Those of ordinary skill in the art can make various modifications to embodiments without departing from the scope and objectives of the present invention. All variations and modifications are intended to be included in the scope of the present invention as defined by the appended claims.

It is to be understood that at least some aspects of the present invention may be implemented as a program product alternatively. A program defining functions of the present invention may be transferred to a data storage system or a computer system by various signal bearer media. The signal bearer media include, without limitation to, a non-writable storage medium (e.g., CD-ROM), a writable storage medium (e.g., a floppy, a hard disk drive, read/write CD ROM, an optical medium), and a communication medium such as a computer including Ethernet, a telephony network or the like. Therefore, it is to be understood that when such kinds of signal bearer media carry or are encoded with computer-readable instructions managing method functions of the present invention, they represent alternative embodiments of the present invention. The present invention may be implemented as hardware, software, firmware, or a combination thereof. The present invention may be implemented in a computer system in a centralized or distributed manner. In a distributed manner, different components are distributed in several interconnected computer systems. Any computer system or other apparatus which is applicable to implement the method described herein is suitable. Preferably, the present invention is implemented as a combination of computer software and general-purpose computer hardware. In this implementation, a computer program, when loaded and executed, controls the computer system to execute the method of the present invention or form the system of the present invention.

The description of preferred embodiments of the present invention has been presented for purposes of illustration, and is not intended to be exhaustive or intended to limit the invention to the form disclosed. Many modifications and variations are possible in view of the above teaching. It is apparent to those skilled in the art that these modifications and variations are included in the scope of the present invention as defined by the appended claims.

The invention claimed is:

1. A computer implemented method of locating isolation points in an application under multi-tenant environment, comprising:
scanning, with a computer device, the application by using scanning rules, to obtain potential isolation points and relationships between the potential isolation points;
specifying at least one isolation point among the potential isolation points;
screening isolation points from the potential isolation points by using relationships between the specified at least one isolation point and the remaining potential isolation points;
specifying at least one shared point among the potential isolation points;

filtering out a shared point among the potential isolation points by using relationships between the specified at least one shared point and the remaining potential isolation points; and detecting whether the shared point exists among the screened isolation point, wherein at least one of the potential isolation points is of a static variable type, wherein all variable statements of the at least one of the potential isolation points are found through static analysis.

2. The method according to claim 1, wherein the relationships between the potential isolation points comprise at least one of an assignment relationship and a membership relationship.

3. The method according to claim 2, wherein the screening of the isolation points from the potential isolation points by using relationships between the specified at least one isolation point and the remaining potential isolation points comprises:

determining a potential isolation point as one of the screened isolation points if the specified at least one isolation point is assigned to one of the potential isolation points.

4. The method according to claim 2, wherein the screening of the isolation points from the potential isolation points by using relationships between the specified at least one isolation point and the remaining potential isolation points comprises:

determining a potential isolation point as one of the screened isolation points if the specified at least one isolation point contains a potential isolation point.

5. The method according to claim 1, wherein the filtering out of the shared point among the potential isolation points by using relationships between the specified at least one shared point and the remaining potential isolation points further comprises:

determining a potential isolation point as the shared point if that potential isolation point is assigned to the shared point.

6. The method according to claim 1, wherein the filtering out of the shared point among the potential isolation points by using relationships between the specified at least one shared point and the remaining potential isolation points further comprises:

determining a potential isolation point as the shared point if that potential isolation point contains the shared point.

7. The method according to claim 1, further comprising:

reporting the existence of a conflicting isolation point in response to the detecting that the shared point exists among the screened isolation points.

8. The method according to claim 1, further comprising:

recommending to a user a high-probability isolation point among the remaining potential isolation points by calculating correlation degrees of the remaining potential isolation points with the screened isolation points.

9. An apparatus including a memory storing executable instructions for locating isolation points in an application under multi-tenant environment, comprising:

a scanning module configured to:
scan the application, by using scanning rules, to obtain potential isolation points and relationships between the potential isolation points, and
specify at least one shared point among the potential isolation points;

a specifying module configured to specify at least one isolation point among the potential isolation points;

an isolation point screening module configured to screen isolation points from the potential isolation points by using relationships between the specified at least one isolation point and the remaining potential isolation points;

a shared point filtering module configured to filter out a shared point among the potential isolation points by using relationships between the specified at least one shared point and the remaining potential isolation points; and a conflict reporting module configured to detect whether the shared point exists among the screened isolation points, wherein at least one of the potential isolation points is of a static variable type, wherein all variable statements of the at least one of the potential isolation points are found through static analysis.

10. The apparatus according to claim 9, wherein the relationships between the potential isolation points comprise at least one of an assignment relationship and a membership relationship.

11. The apparatus according to claim 10, wherein the isolation point screening module is further configured to determine a potential isolation point as one of the isolation points if the specified at least one isolation point is assigned to one of the potential isolation points.

12. The apparatus according to claim 10, wherein the isolation point screening module is further configured to determine a potential isolation point as one of the isolation points if the specified at least one isolation point contains the potential isolation point.

13. The apparatus according to claim 9, wherein the shared point filtering module is further configured to determine a potential isolation point as the shared point if that potential isolation point is assigned to the specified at least one shared point.

14. The apparatus according to claim 9, wherein the shared point filtering module is further configured to determine a potential isolation point as the shared point if that potential isolation point contains the specified at least one shared point.

15. The apparatus according to claim 9, wherein the conflict reporting module is further configured to report the existence of a conflicting isolation point in response to the detection of the shared point existing among the screened isolation points.

16. The apparatus according to claim 9, further comprising:

an isolation point recommending module configured to recommend to a user a high-probability isolation point among the remaining potential isolation points by calculating correlation degrees of the remaining potential isolation points with the screened isolation points.

* * * * *